(12) United States Patent
Inagaki

(10) Patent No.: US 8,014,903 B2
(45) Date of Patent: Sep. 6, 2011

(54) METHOD FOR SUPPRESSING VIBRATION AND DEVICE THEREFOR

(75) Inventor: Hiroshi Inagaki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 336 days.

(21) Appl. No.: 12/255,120

(22) Filed: Oct. 21, 2008

(65) Prior Publication Data

US 2009/0110499 A1    Apr. 30, 2009

(30) Foreign Application Priority Data

Oct. 25, 2007  (JP) .................................. 2007-277865
Feb. 18, 2008  (JP) .................................. 2008-036489

(51) Int. Cl.
*G05B 21/00* (2006.01)
*G05B 13/00* (2006.01)
*G05B 15/00* (2006.01)
*G01M 1/38* (2006.01)
*G05D 23/00* (2006.01)

(52) U.S. Cl. ............. 700/280; 700/279; 702/56; 73/597; 73/659; 73/660

(58) Field of Classification Search .......... 700/279–280; 702/56; 73/597, 659–660
See application file for complete search history.

(56) References Cited

U.S. PATENT DOCUMENTS

| | | | |
|---|---|---|---|
| 4,025,724 A * | 5/1977 | Davidson et al. | 381/71.2 |
| 4,435,751 A * | 3/1984 | Hori et al. | 700/280 |
| 6,085,121 A | 7/2000 | Stern | |
| 6,223,102 B1 * | 4/2001 | Busch | 700/279 |
| 6,697,759 B2 * | 2/2004 | Saarinen et al. | 702/145 |
| 6,748,300 B2 * | 6/2004 | Sato | 700/304 |
| 6,883,373 B2 * | 4/2005 | Dyer | 73/462 |
| 7,155,973 B2 * | 1/2007 | Dyer | 73/462 |
| 7,381,017 B2 * | 6/2008 | Wang et al. | 409/131 |
| 7,501,783 B2 * | 3/2009 | Imadu et al. | 318/611 |
| 7,540,697 B2 * | 6/2009 | Wang et al. | 409/141 |
| 2005/0160811 A1 * | 7/2005 | Dyer | 73/462 |
| 2008/0289923 A1 * | 11/2008 | Suzuki et al. | 188/379 |
| 2009/0069927 A1 * | 3/2009 | Suzuki et al. | 700/177 |
| 2010/0010662 A1 * | 1/2010 | Inagaki | 700/175 |
| 2010/0104388 A1 * | 4/2010 | Suzuki et al. | 409/131 |

FOREIGN PATENT DOCUMENTS

| | | |
|---|---|---|
| JP | 08-229772 A1 | 9/1996 |
| JP | 2001-517557 A1 | 10/2001 |
| JP | 2003-340627 A1 | 12/2003 |

* cited by examiner

*Primary Examiner* — Ramesh B Patel
(74) *Attorney, Agent, or Firm* — Burr & Brown

(57) ABSTRACT

The vibration suppressing device includes vibration sensors, a FFT calculating unit, a store device, a calculating unit, and a NC device. The vibration sensors detect a time-domain vibrational acceleration of a rotary shaft during rotating. The FFT calculating unit calculates a frequency of chatter vibration and a frequency-domain vibrational acceleration in the frequency of chatter vibration on the basis of the detected time-domain vibrational acceleration. The store device stores the frequency-domain vibrational acceleration, the frequency of chatter vibration and the like as machining information. When the calculated maximum frequency-domain acceleration exceeds a predetermined threshold value, the calculating unit stores the maximum acceleration, the frequency of chatter vibration, and the like as current machining information in the store device, and calculates an optimal rotation speed of the rotary shaft, by which the chatter vibration can be suppressed, based on the current machining information and previous machining information stored in the store device. The NC device rotates the rotary shaft at the optimal rotation speed.

6 Claims, 7 Drawing Sheets

METHOD FOR SUPPRESSING VIBRATION AND DEVICE THEREFOR

This application claims the benefit of Japanese Patent Application Numbers 2007-277865 filed on Oct. 25, 2007 and 2008-036489 filed on Feb. 18, 2008, the entirety of which is incorporated by reference.

BACKGROUND OF THE INVENTION

1. Field of the Invention

The present invention relates to a method for suppressing vibration generated during the machining in a machine tool for carrying out a machining while rotation of a tool or a work, and a vibration suppressing device capable of performing this method.

2. Description of the Background Art

As conventional methods for suppressing vibration generated in a machine tool, the method described in Patent document 1 has been known. In order to suppress regenerating chatter vibration as self-exciting vibration causing poor finishing of workpiece surface roughness, this method for suppressing vibration includes the steps of measuring a characteristic frequency of a system in which a chatter vibration of a tool, a work, or the like is generated, and acquiring the characteristic frequency by being multiplied by 60, dividing the frequency by the number of tool flutes and a predetermined integer so as to obtain a value, and using this value as a rotation speed (a stable rotation speed). The characteristic frequency can be acquired by impulse-exciting a tool or a work Further, as methods for suppressing vibration, the method described in Patent document 2 has been known. This method for suppressing vibration includes steps of measuring frequency of chatter vibration during machining of a system generating chatter vibration, acquiring the frequency of chatter vibration by being multiplied by 60, dividing the frequency by the number of tool flutes and a predetermined integer so as to acquire a value, and using this value as a rotation speed. The frequency of chatter vibration occurred during the machining is acquired by an audio sensor arranged near the tool or the work, and measuring an oscillation frequency detected by the audio sensor during the machining.

Patent document 1: Japanese Unexamined Patent Publication No. 2003-340627

Patent document 2: Japanese Translation of PCT No. 2001-517557

SUMMARY OF THE INVENTION

The method for suppressing vibration disclosed in Patent document 1 requires an expensive impulse device, and a high technique for using this device, which takes time and effort. Further, since a characteristic frequency measured before machining does not correspond with a characteristic frequency during the machining, an accurate optimal rotation speed is hardly acquired.

Furthermore, in a method for suppressing vibration disclosed in Patent document 2, since chatter frequency and a characteristic frequency during machining are slightly different, the accurate optimal rotation speed is hardly acquired. Further, it can be considered that an accuracy is improved by estimating a characteristic vibration from a chatter frequency during machining. However, when chatter is regenerated after suppressing chatter, a parameter (a k number indicated in a predicted stability chart) used for estimating the characteristic frequency to suppress the regenerated chatter or calculating a stable rotation speed may be also changed in many cases since a rotation speed is changed from a rotation speed before suppression of chatter. When the k number is changed, the rotation speed decreases or increases and thus when changing of the k number is repeated, the rotation speed consecutively decreases or consecutively increases whenever chatter is generated.

An object of the present invention is to provide a vibration suppressing device capable of acquiring an optimal rotation speed by which chatter vibration can be effectively suppressed.

Another object of the present invention is to provide a vibration suppressing method and a device therefor, which can acquire an accurate and stable rotation speed for suppressing vibration without consecutively decreasing or consecutively increasing of the rotation speed even when chatter is generated intermittently.

To achieve the above objects, a first aspect of the invention is a vibration suppressing device, which suppresses chatter vibration generated during rotation of a rotary shaft in a machine tool having the rotary shaft for rotating a tool or a work. The device includes detection unit, first calculation unit, store unit, second calculation unit, and rotation speed control unit. The detection unit detects a time-domain vibration of a rotating rotary shaft. The first calculation unit calculates a frequency of chatter vibration and a frequency-domain vibration in this frequency of chatter vibration based on the time-domain vibration detected by the detection unit. The store unit stores the frequency-domain vibration, the frequency of chatter vibration, and the rotary shaft rotation speed as machining information. When the frequency-domain vibration calculated by the first calculation unit exceeds a predetermined threshold value, the second calculation unit stores the frequency-domain vibration, the frequency of chatter vibration, and the rotary shaft rotation speed in the store unit as a current machining information, and calculates an optimal rotary shaft rotation speed, by which chatter vibration can be suppressed, based on the previous machining information stored in the store unit. The rotation speed control unit rotates the rotary shaft at the optimal rotation speed calculated by the second calculation unit. It should be noted that "the vibration" described in the first aspect includes not only a vibrational acceleration, a displacement due to vibration, a sound pressure due to vibration, and a vibration itself but also a physical change which is generated at the rotary shaft due to vibration and can be indirectly related to vibration.

A second aspect of the invention is a device including a following feature in addition to the first aspect. That is, the second calculation unit calculates phase information based on the formulas (1) to (3), and calculates the optimal rotation speed based on the phase information and the previous machining information which is stored in the store unit.

$$k' \text{ number} = 60 \times \text{frequency of chatter vibration}/(\text{the number of tool flutes} \times \text{rotary shaft rotation speed}) \quad (1)$$

$$k \text{ number} = \text{integer part of } k' \text{ number} \quad (2)$$

$$\text{phase information} = k' \text{ number} - k \text{ number} \quad (3)$$

A third aspect of the invention is a method for suppressing chatter vibration generated during rotation of a rotary shaft in a machine tool having the rotary shaft for rotating a tool or a work. The method includes a detecting step, a calculating step, and controlling step of a rotation speed. In the detecting step, the time-domain vibration due to the rotating rotary shaft is detected. In the calculating step, the chatter frequency and the frequency-domain vibrational acceleration in the chatter frequency are calculated based on the time-domain vibration detected in the detecting step. When the calculated frequency-domain vibrational acceleration exceeds a predetermined threshold value, machining information is calculated by using at least the chatter frequency, and stored. When the previous machining information is not stored, a stable rotation speed capable of suppressing the chatter vibration of the rotary shaft is calculated by using the calculated machining information. On the other hand, when previous machining information is stored, the stable rotation speed is calculated by using the previous machining information. The rotary shaft is rotated at the stable rotation speed calculated by the calculating step by the rotation speed control step.

A fourth aspect of the invention is a method for suppressing chatter vibration in the third aspect, in which machining information is kept at a certain level, so that consecutively increasing or consecutively decreasing of the stable rotation speed is simply, efficiency prevented. When the previous machining information is stored, the stable rotation speed is calculated by using only the stored machining information.

A fifth aspect of the invention is a vibration suppressing device for suppressing chatter vibration generated during rotation of a rotary shaft in a machine tool having the rotary shaft for rotating a tool or a work. The device includes detection unit, calculation unit, and rotation speed control unit. The detection unit detects the time-domain vibration due to the rotating rotary shaft. The calculation unit calculates the chatter frequency and the frequency-domain vibrational acceleration in the chatter frequency based on the time-domain vibration detected by the detection unit. In this aspect, when the calculated frequency-domain vibrational acceleration exceeds a predetermined threshold value, the calculation unit calculates machining information by using at least the chatter frequency, and stores the calculated information. When previous machining information is not stored, the calculation unit calculates a stable rotation speed capable of suppressing the chatter vibration of the rotary shaft by using the calculated machining information. When previous machining information is stored, the calculation unit calculates the stable rotation speed by using at least the previous machining information. The rotation speed control unit rotates the rotary shaft at the stable rotation speed calculated by the calculation unit.

A sixth aspect of the invention is the device in the fifth aspect where consecutively increasing or consecutively decreasing of the stable rotation speed is simply, efficiency prevented by machining information being kept at a certain level. When previous machining information is stored, the calculation unit calculates the stable rotation speed by using only the stored machining information.

According to the present invention, a more exact optimal rotation speed can be immediately calculated, since a "chatter vibration" generated at the actual rotation of a rotary shaft is detected to calculate an optimal rotation speed. Therefore, an amplification of a "chatter vibration" can be accurately suppressed, and thus a chatter mark is not remained on the machined face.

Further, whenever a frequency-domain vibration exceeds a predetermined threshold value, the vibration, the frequency of chatter vibration, and the rotation speed of the rotary shaft are stored in store unit as machining information. When a vibration exceeds the threshold value after the information is stored, the optimal rotation speed is calculated by using previous machining information stored in the store unit. Therefore, an optimal rotation speed at which a regenerative chatter vibration is least generated, indicated in a predicted stability chart, can be easily calculated. Thus, finishing of workpiece surface roughness can be kept in a high level.

Furthermore, according to the present invention, the machining information is stored and a stable rotation speed is calculated by which chatter vibration of a rotary shaft can be suppressed based on the previous machining information. Therefore, the calculated stable rotation speed is not greatly different from the previous stable rotation speed. Thus, even when chattering is generated intermittently, consecutively decreasing or consecutively increasing of the rotation speed can be prevented.

DESCRIPTION OF THE PREFERRED EMBODIMENTS

Figure 1:
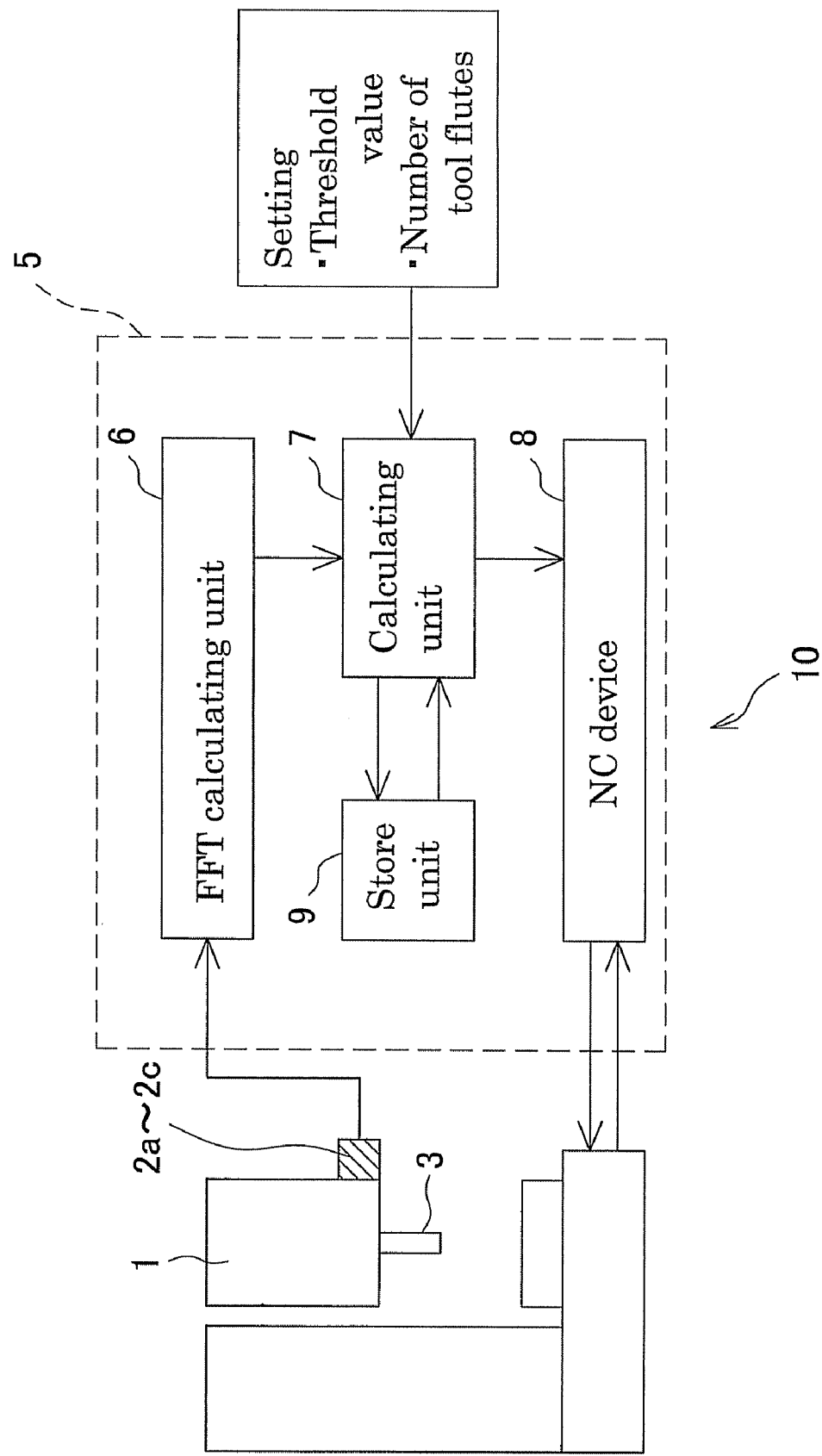
FIG. 1 is a view to illustrate a block diagram of a vibration suppressing device according to a first embodiment of the present invention.

Embodiments according to the present invention will be described properly referring to the drawings. In addition, an embodiment of the present invention is not limited by this embodiment.

First Embodiment

A vibration suppressing device according to one preferred embodiment of the present invention will be described below referring to the drawings.

Figure 2:
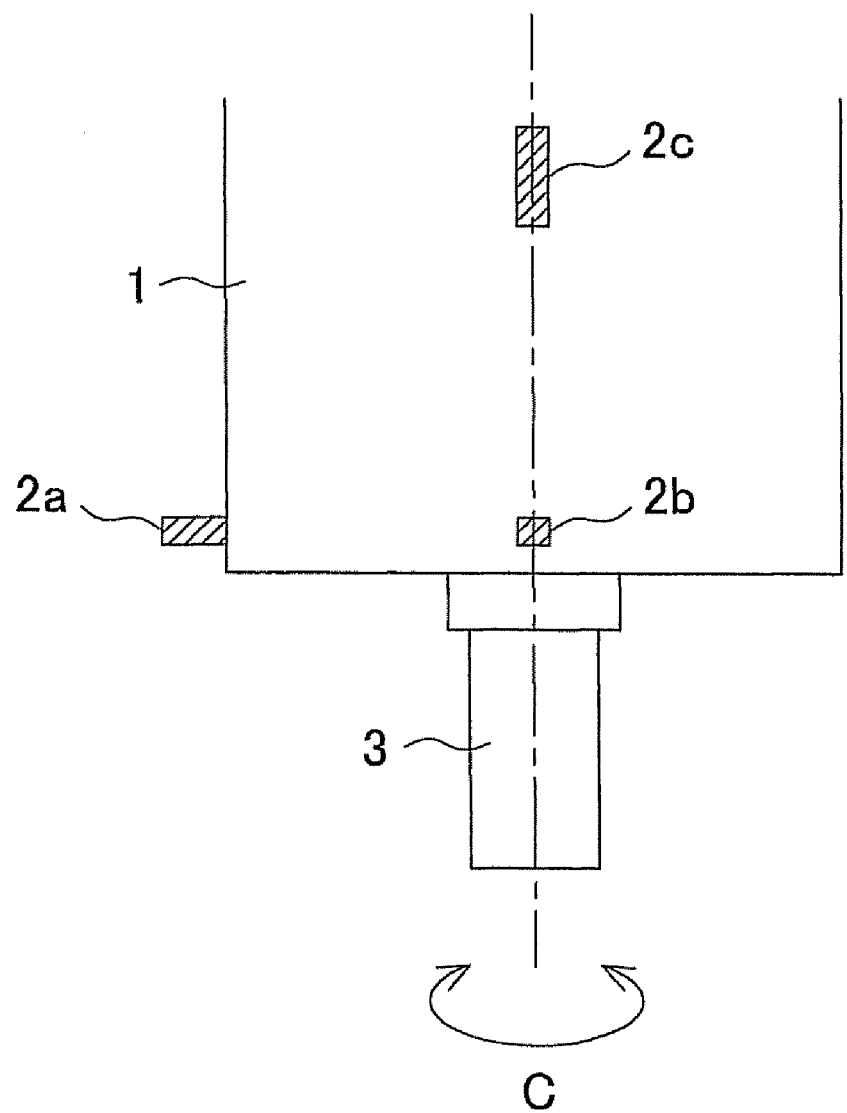
FIG. 2 is a side face view of a rotary shaft housing as an object of vibration suppressing.
Figure 3:
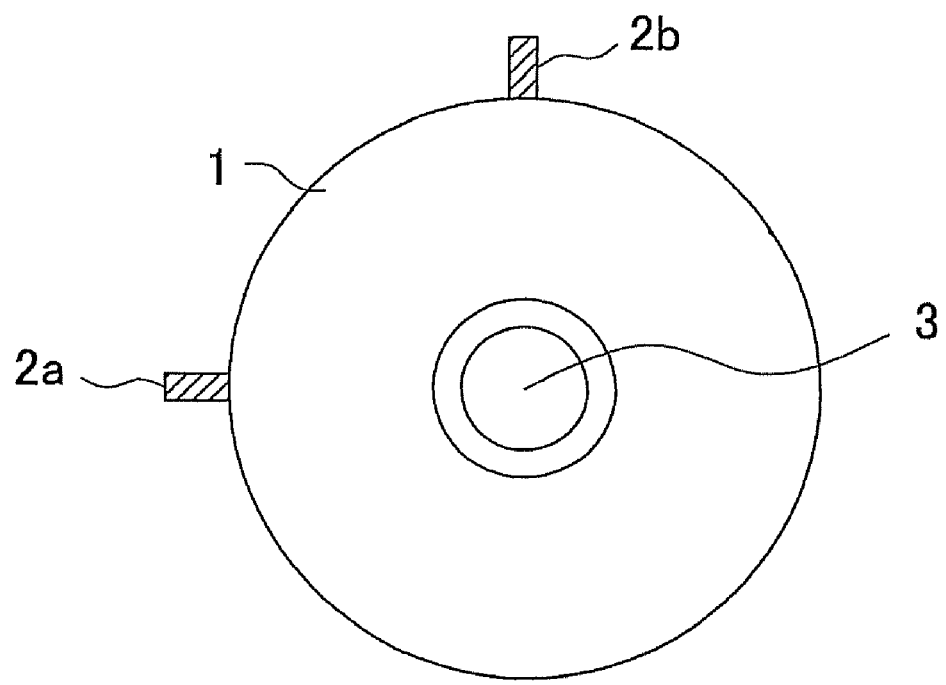
FIG. 3 is a view to illustrate a rotary shaft housing from an axial direction.

FIG. 1 is a view to illustrate a block diagram of a vibration suppressing device 10. FIG. 2 is a side face view of a rotary shaft housing 1 as an object of vibration suppressing. FIG. 3 is a view to illustrate a rotary shaft housing 1 from an axial direction.

The vibration suppressing device 10 is a device for suppressing a "chatter vibration" generated at a rotary shaft 3 which is provided at the rotary shaft housing 1 so as to be rotatable around a spindle C. The vibration suppressing device 10 includes vibration sensors (detection unit) $2a$ to $2c$ for detecting a time-domain vibrational acceleration (which means vibration acceleration on a time axis) which is generated at the rotating rotary shaft 3, and a control device 5 for controlling a rotation speed of the rotary shaft 3 based on a detected value by the vibration sensors $2a$ to $2c$.

As illustrated in FIGS. 2 and 3, the vibration sensors $2a$ to $2c$ are attached to positions near the rotary shaft 3 of the rotary shaft housing 1, and one vibration sensor detects a time-domain vibrational acceleration in a perpendicular direction with respect to another sensor (for example, a time-domain vibrational acceleration in X, Y, and Z axial directions, which are at right angles to one another, respectively, is detected).

On the other hand, the control device 5 includes a FFT calculating unit (first calculation unit) 6 for carrying out analysis based on a time-domain vibrational acceleration detected by the vibration sensors 2a to 2c, a calculating unit (second calculation unit) 7 for calculating an optimal rotation speed based on the value calculated by the FFT calculating unit 6, a store device (store unit) 9 for storing a calculated value or the like calculated by the calculating unit 7, and a NC device (rotation speed control unit) 8 for controlling machining of the rotary shaft housing 1. The control device 5 controls the rotation speed of the rotary shaft 3 as described below so as to suppress a chatter vibration generated at the rotary shaft 3.

Figure 5:
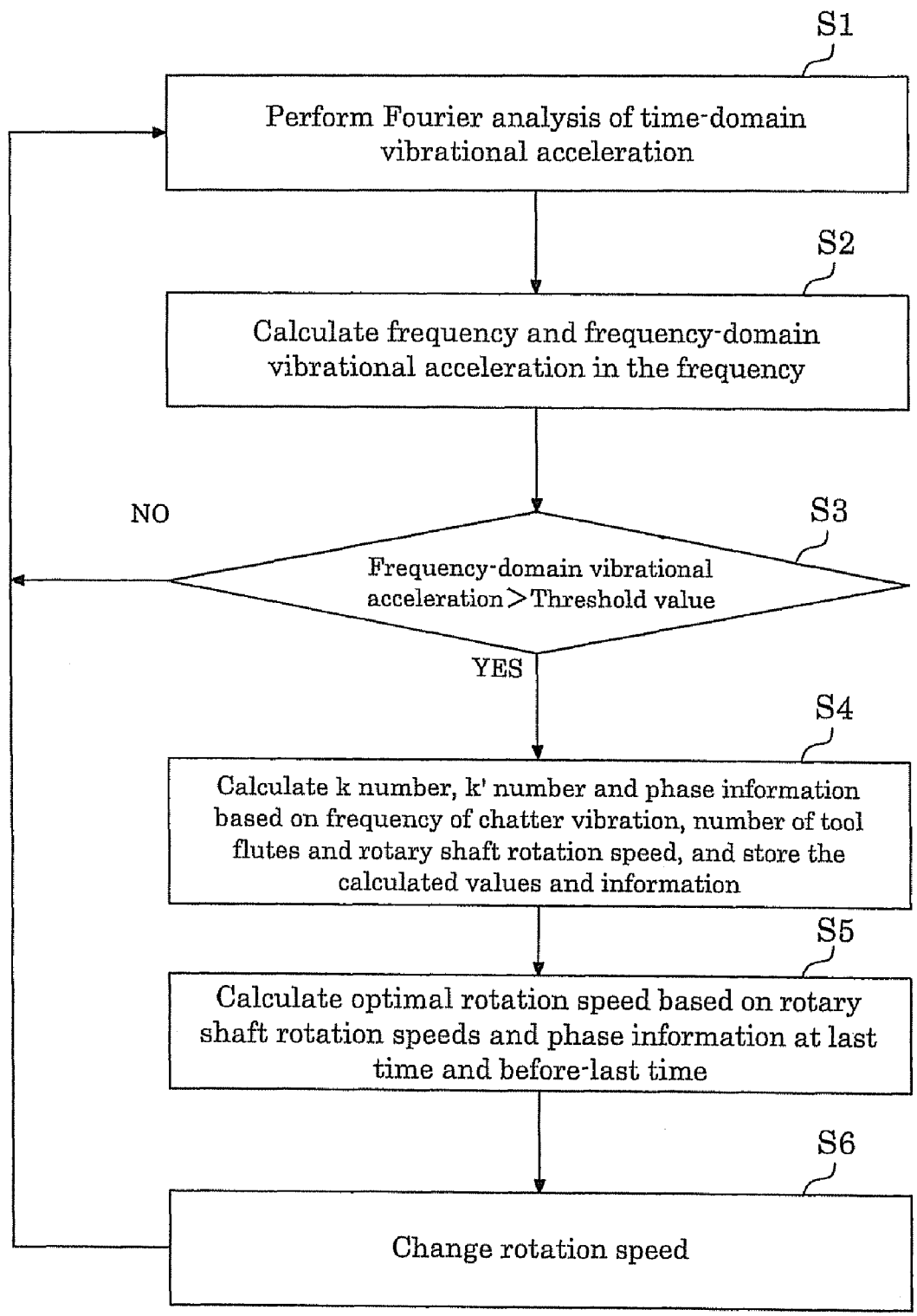
FIG. 5 is a flowchart according to suppressing and controlling of chatter vibration.

Then, suppressing and controlling of "chatter vibration" in the control device 5 will be described referring to a flowchart of FIG. 5.

Figure 4:
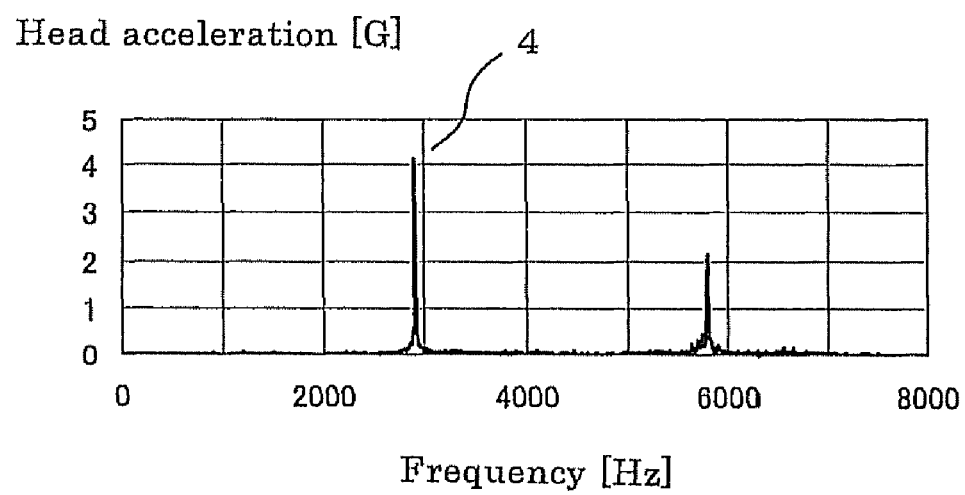
FIG. 4 is a view to illustrate one example of a result of Fourier analysis of time-domain vibrational acceleration.

First, the FFT calculating unit 6 carries out a Fourier transform of a time-domain vibrational acceleration which is constantly detected during rotation of the rotary shaft 3 by the vibration censors 2a to 2c (S1), and calculates a maximum acceleration (a frequency-domain vibrational acceleration) and its frequency (a frequency of chatter vibration) as denoted with a numeral 4 in FIG. 4 (S2).

Then, the calculating unit 7 compares the maximum acceleration calculated in S2 with a preset predetermined threshold value (S3). When the maximum acceleration exceeds the threshold value, the calculating unit 7 determines that a "chatter vibration" which must be suppressed is generated at the rotary shaft 3, calculates a k' number, a k number, and phase information by the following arithmetic expressions (1) to (3) using a frequency of chatter vibration, the number of tool flutes, and a rotation speed of the rotary shaft 3. Then the calculating unit 7 stores the maximum acceleration and the frequency of chatter vibration, which are calculated in S2, and a present rotation speed of the rotary shaft 3, in addition to the k' number, the k number, and the phase information, in the store device 9 as current machining information (S4).

$$k' \text{ number} = 60 \times \text{frequency of chatter vibration}/(\text{the number of tool flutes} \times \text{rotation speed of rotary shaft}) \quad (1)$$

$$k \text{ number} = \text{n integer part of } k' \text{ number} \quad (2)$$

$$\text{phase information} = k' \text{ number} - k \text{ number} \quad (3)$$

Here, "the number of tool flutes" in the arithmetic expression (1) is assumed to be previously inputted and set in the calculating unit 7. A rotation speed of a rotary shaft in the arithmetic expression (1) is a present rotation speed (before set to the optimal rotation speed).

Then, among the machining information stored in the store device 9, phase information and a rotation speed of a rotary shaft at the time of exceeding a threshold value in the last time (previous machining information), and phase information and a rotation speed of a rotary shaft at the time of exceeding the threshold value in the before-last time (previous machining information) are read, and an optimal rotation speed is calculated using following arithmetic expressions (4) and (5) (S5).

$$\text{Amount of rotation speed change} = (1 - \text{phase information of before-last time}) \times (\text{rotation speed of rotary shaft in the before-last time} - \text{a rotation speed of rotary shaft in the last time})/(\text{phase information of the last time} - \text{phase information of the before-last time}) \quad (4)$$

$$\text{Optimal rotation speed} = \text{a rotation speed of a rotary shaft in the before-last time} - \text{an amount of speed change} \quad (5)$$

Then, the NC device 8 changes the rotation speed of the rotary shaft 3 so as to be the calculated optimal rotation speed, and thus prevents, that is, suppresses an amplification of a "chatter vibration" (S6).

As has been described, the control device 5 suppresses and controls a chatter vibration.

In addition, in cases that a detection of a maximum acceleration exceeding the threshold value is a first time and a second time after starting rotating of the rotary shaft 3, the arithmetic expression (4) cannot be used. Therefore, in these cases, the phase information obtained by the arithmetic expression (3) and a set constant are compared after S3. When the phase information is equal to or greater than the set constant, a k1 number is calculated by an arithmetic expression (6). When the phase information is less than the set constant, a k1 number is calculated by an arithmetic expression (7).

$$k1 \text{ number} = k \text{ number} + 1 \quad (6)$$

$$k1 \text{ number} = k \text{ number} \quad (7)$$

Here, as for the set constant, when the constant is set to be 0.5, an amount of change of the rotation speed can be made minimum in general. However, when an amount of changing rate of the rotation speed is small, a cutting speed may be less than a minimum value determined by a predicted stability chart depending on a direction to change the rotation speed, so that a regenerative chatter vibration may be generated. Thus, it is desirable that the minimum value of cutting speed is made to be the set constant and compared with the phase information. In this case, the set constant is desirably to be 0.75.

The optimal rotation speed can be calculated by an arithmetic expression (8) using the k1 number obtained by the above-mentioned arithmetic expression (6) or (7), and the rotation speed of the rotary shaft 3 can be changed so as to have the optimal rotation speed.

$$\text{Optimal rotation speed} = 60 \times \text{frequency of chatter vibration}/(\text{the number of tool flutes} \times k1 \text{ number}) \quad (8)$$

The above-mentioned vibration suppressing device 10 monitors "a chatter vibration" generated during the rotation of the rotary shaft 3 on a real time by the vibration sensors 2a to 2c, the FFT calculating unit 6, and the calculating unit 7. When generation of a "chatter vibration" is detected, the vibration suppressing device 10 calculates the optimal rotation speed immediately using the arithmetic expressions (1) to (5) and changes the rotation speed of the rotary shaft 3 to the optimal rotation speed. Accordingly, since a chatter vibration generated at the actually rotating rotary shaft 3 is detected and an optimal rotation speed is calculated, a more correct optimal rotation speed can be calculated immediately. Therefore, an amplification of a "chatter vibration" can be accurately suppressed, and the chatter mark does not remain on a machined face.

Further, whenever a maximum acceleration of a frequency-domain vibrational acceleration exceeds a threshold value, the store device 9 stores the k' number, the k number and the phase information which are calculated by the arithmetic expressions (1) to (3) as current machining information, in addition to the maximum acceleration, the frequency thereof (the the frequency of chatter vibration), and the rotation speed of the rotary shaft. When the maximum acceleration exceeds the threshold value in a next time and subsequent ones, an optimal rotation speed is calculated using the previous machining information stored in the store device 9. Therefore, an optimal rotation speed at which a regenerative chatter vibration is least generated, which is indicated in a predicted stability chart, can be easily calculated, and finishing of workpiece surface roughness can be kept in a high level.

Further, when "chatter vibrations" at a first time and a second time are detected, in which enough machining information is not stored in the store device 9, phase information is compared with a set information, and an optimal rotation speed is calculated, respectively, based on the k1 number which is changed corresponding to the compared result. Therefore, a "chatter vibration" can be suppressed in a short time, and it can be expected to improve finishing of workpiece surface roughness, restrain a tool wear, and prevent the damage of a tool.

It should be noted that the vibration suppressing according to the present invention is not limited to the above-mentioned embodiment. Configurations of detection unit, a control device, and controlling vibration restrain in the control device can be properly changed if necessary without departing from the spirit of the present invention.

For example, when the k' number, the k number, the phase information, an amount of speed change and the like, and relationship thereof, which are described in the arithmetic expressions (1) to (8), are properly checked according to a kind of a machine tool and determined, the precision can be more improved.

Further, when an amount of speed change is calculated, the phase information in the before-last time is subtracted from the constant "1" in the arithmetic expression (4). However, although the constant is theoretically 1, a value slightly deviated from "1" such as "1.05" can be used to obtain an amount of speed change.

Further, in the first embodiment, when a Fourier transform of the time-domain vibrational acceleration detected by the detection unit is carried out, a "chatter vibration" is controlled and suppressed by using a peak in which a frequency-domain vibrational acceleration indicates the maximum. However, the suppressing effect for a "chatter vibration" may be further improved by calculating an optimal rotation speed using a plurality of peaks (for example, three peaks) in which values of frequency-domain vibrational accelerations are in high order.

Further, in the first embodiment, it is adopted to detect a vibrational acceleration of a rotary shaft using the vibration sensors. However, it is also possible to have a configuration that the vibration suppressing device detects a displacement or a sound pressure due to vibration and calculates an optimal rotation speed based on the detected displacement or sound pressure.

In addition, in the first embodiment, it is adopted to detect a vibration of a rotary shaft of a machine tool. However, it is also possible to have a configuration that the device detects a vibration of a work which is on a not rotating side (a fixed side) and calculates an optimal rotation speed. Also, the present invention can be applied to not only a machining center for rotating a tool but also a machine tool for rotating a work such as a lathe. In addition, of course, an installation position and an installation number of detection means can be properly changed depending on a kind or a size of a machine tool.

Second Embodiment

Figure 6:
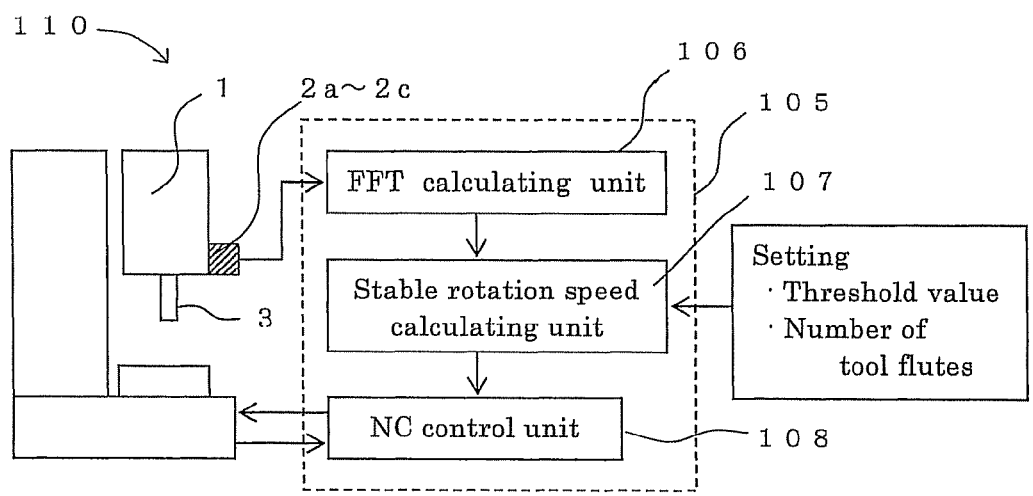
FIG. 6 is a view to illustrate a block diagram of a vibration suppressing device according to a second embodiment of the present invention.

FIG. 6 is a block diagram of a vibration suppressing device 110 according to a second embodiment of the present invention. The vibration suppressing device 110 includes a rotary shaft housing 1 (refer to FIGS. 2 and 3) as an object of vibration suppressing, like the first embodiment. The rotary shaft housing 1 includes a rotary shaft 3 rotatable around a C axis spindle. The vibration suppressing device 110 suppresses a chatter vibration generated at the rotating rotary shaft 3. The vibration suppressing device 110 includes vibration sensors $2a$ to $2c$ as detection unit adapted to detect a time-domain vibrational acceleration which is generated at the rotating rotary shaft 3, and a control device 105 for controlling the rotation speed of the rotary shaft 3 based on the value detected by the vibration sensors $2a$ to $2c$.

As illustrated in FIGS. 2 and 3, in order to detect a time-domain vibrational acceleration (a vibration acceleration on a time axis) in orthogonally crossed directions, the vibration sensors $2a$ to $2c$ are attached to the rotary shaft housing 1 so as to detect the time-domain vibrational acceleration in X, Y and Z axial directions which are orthogonally crossed each other.

Further, control device 105 includes an FFT calculating unit 106 for performing Fourier analysis based on the time-domain vibrational acceleration detected by the vibration sensors $2a$ to $2c$, a stable rotation speed calculating unit 107 for calculating a stable rotation speed based on the value calculated by the FFT calculating unit 106, and an NC device 108 as rotation speed control means adapted to control processing in the rotary shaft housing 1. The NC device 108 in the control device 105 monitors the rotation speed of the rotary shaft 3. In addition, the FFT calculating unit 106 and the stable rotation speed calculating unit 107 correspond to calculation unit.

Figure 7:
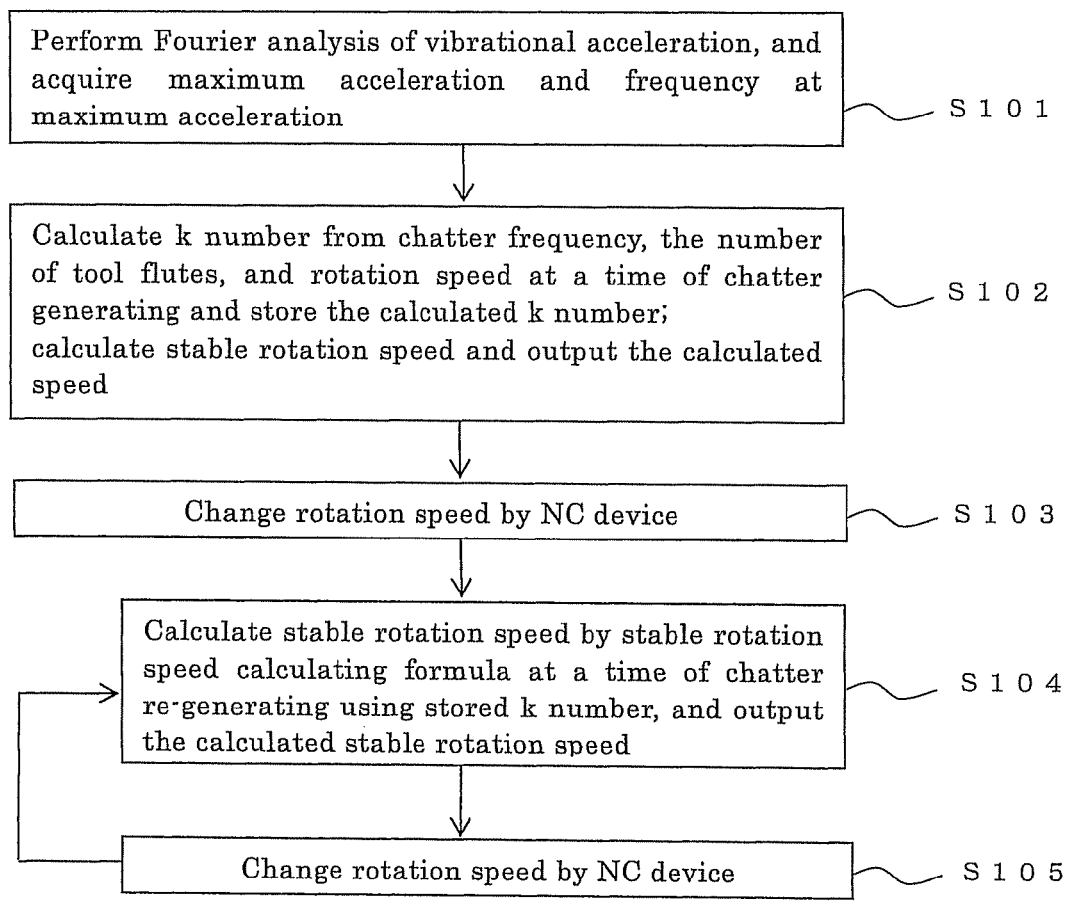
FIG. 7 is a flowchart of a vibration suppressing method executed in the vibration suppressing device in FIG. 6.

An example of a vibration suppressing method of chatter vibration by the vibration suppressing device 110 having the above-mentioned configuration will be mainly described referring to FIG. 7. FIG. 7 is a flowchart of the restraint control.

The FFT calculating unit 106 performs Fourier analysis of time-domain vibrational acceleration, which is constantly detected during rotation by the vibration sensors $2a$ to $2c$, and constantly calculates a maximum acceleration and its frequency 4 (frequency of chatter vibration) as illustrated in FIG. 4 (step S101 in FIG. 7, the detection step) like the first embodiment. In addition, when the Fourier analysis of the time-domain vibrational acceleration is performed, a plurality of patterns of peaks indicating a correlation between the frequency and the frequency-domain vibrational acceleration as illustrated FIG. 4 are acquired. However, this embodiment uses a peak having a maximum value of the frequency-domain vibrational acceleration.

Then, the stable rotation speed calculating unit 107 compares the frequency-domain vibrational acceleration, which is calculated by the FFT calculating unit 106, with a previously set threshold value. When the frequency-domain vibrational acceleration exceeds a predetermined threshold value (e.g., the frequency-domain vibrational acceleration at the frequency 4 in FIG. 4 is detected), the stable rotation speed calculating unit 107 determines that chatter vibration which must be suppressed is generated at the rotary shaft 3. Then, the stable rotation speed calculating unit 107 calculates a k number by following Formulas (101) and (102), stores as machining information, calculates a stable rotation speed by following Formula (103), and outputs it to the NC device 108 (step S102, a calculation step, in a case that previous machining information is not stored ). Here, the machining information indicates a k number and a k' number. Further, a number of tool flutes are previously set into the stable rotation speed calculating unit 107. Furthermore, the rotary shaft rotation speed is a current rotation speed of the rotary shaft 3 before changing to a stable rotation speed. In addition, the chatter frequency is the frequency 4 when chatter vibration is generated.

k' number=60×chatter frequency/(the number of tool flutes×rotary shaft rotation speed)  (101)

k number=an integer part of a k' number  (102)

$$\text{stable rotation speed} = 60 \times \text{chatter frequency}/\{\text{the number of tool flutes} \times (k \text{ number} + 1)\} \quad (103)$$

When the output of the stable rotation speed from the stable rotation speed calculating unit 107 is received in step S102, the NC device 108 changes the rotation speed of the rotary shaft 3 to a stable rotation speed (step S103, a rotation speed control step). When the rotation speed of the rotary shaft 3 is changed to the stable rotation speed, the chatter vibration is suppressed, so that a stable machining state can be obtained.

Even when a stable machining state in which the chatter vibration is suppressed, the vibration sensors 2a to 2c still detect time-domain vibrational acceleration (a detection step). Further, when the chatter vibration is regenerated and the frequency-domain vibrational acceleration exceeds the predetermined threshold value, the vibration suppressing device 110 recalculates machining information so as to output a stable rotation speed by a similar process in step S102. However, when the calculated k number does not correspond with the k number previously stored (in step S102), the stored k number is replaced by the newly calculated k number so as to calculate a stable rotation speed (step S104, a calculation step, in a case that machining information stored in the past exists). In addition, in step S104, a stable rotation speed can be calculated based on the stored k number without calculating the machining information.

When an output of the stable rotation speed from the stable rotation speed calculating unit 107 in step S104 is received, the NC device 108 changes the rotation speed of the rotary shaft 3 to a stable rotation speed (step S5, a rotation speed controlling step). When the rotation speed of the rotary shaft 3 is changed to the stable rotation speed, the chatter vibration is suppressed so as to have a stable processing state again. Further, this stable rotation speed is calculated based on the same k number as that in the past (step S102). Thus, this stable rotation speed is approximately equal to the past stable rotation speed, and is not widely different from the past stable rotation speed.

Further, when the frequency-domain vibrational acceleration exceeds the predetermined threshold value again through the stable machining state (in a case that the chatter vibration is generated intermittently), the vibration suppressing device 110 repeats the detection by the vibration sensors 2a to 2c and Steps S104 and S105, and makes the rotation speed of the rotary shaft 3 to be a new rotation speed to make a stable machining state. The new stable rotation speed is calculated based on the k number as in step S104. Thus, the new stable rotation speed is similar to the past stable rotation speed, and is not widely different from the past stable rotation speed. Even when the chatter vibration is generated intermittently, the stable rotation speed does not continuously decrease or increase.

The above-mentioned vibration suppressing device 110 calculates a stable rotation speed with a fixed k number based on the k number which is calculated from the past machining result and stored. Thus, when the chatter vibration is generated intermittently, a stable rotation speed is not greatly different from the past rotation speed, and consecutively decreasing or consecutively increasing of the rotation speed of the rotary shaft 3 can be prevented. Therefore, a machined surface can be kept to be a high quality with high efficiency. Further, since a change of the rotation speed of the rotary shaft 3 is little, a problem that an excessive load is applied to a tool or a main spindle can be prevented.

In addition, another embodiment of the present invention which is made by changing mainly the above-mentioned embodiment will be described. Several previous k numbers (e.g., five k numbers) are stored collectively and a new k number can be obtained by rounding off an average value of the predetermined number of the past k numbers (e.g., five k numbers). Or, a new k number can be made by replacing the k number by a value having most number of times in the predetermined number of past k numbers (e.g., five k numbers). In these cases, consecutively increasing or consecutively decreasing of the rotation speed can be prevented. Further, in a Fourier analysis by the control device, a plurality of high-order vibration frequencies in a frequency-domain vibrational acceleration can be extracted so as to calculate a stable rotation speed using these vibration frequencies. Furthermore, a sound pressure generated by a displacement or a rotation due to a vibration can be detected instead of or together with the vibrational acceleration of the rotary shaft so as to calculate a stable rotation speed.

In addition to this, the detection means can be arranged on a fixing side (a work and/or a location near the work) in place of or together with the rotary shaft side. Further, the present invention can be applied to other machine tools including a lathe for rotating a work. In the machine tool rotating a work, vibration on a main spindle side holding a work side can be detected, and vibration on a tool side as the fixed side can be detected. Further, the number of detection unit and an arrangement thereof providing position or the providing number of detection unit can be properly changed corresponding to a kind or a size of a machine tool. Furthermore, various kinds of calculating units can be integrated or separated, and a separated storing device can be provided besides a calculating device.

What is claimed is:

1. A vibration suppressing device for a machine tool having a rotary shaft for suppressing a chatter vibration generated when the rotary shaft is rotated, the device comprising:
   a detection unit to detect time-domain vibration due to the rotating rotary shaft;
   a first calculation unit to calculate a frequency of chatter vibration and a frequency-domain vibration in the frequency of chatter vibration based on the time-domain vibration detected by the detection unit;
   a storage unit to store the frequency-domain vibration, the frequency of chatter vibration, and a rotation speed of the rotary shaft as machining information;
   a second calculation unit to store the frequency-domain vibration, the frequency of chatter vibration, and the rotation speed of the rotary shaft in the store unit as current machining information when the frequency-domain vibration calculated by the first calculation unit exceeds a predetermined threshold value, and to calculate an optimal rotation speed of the rotary shaft capable of suppressing the chatter vibration based on the current machining information and previous machining information stored in the storage unit; and
   a rotation speed control unit to rotate the rotary shaft at the optimal rotation speed calculated by the second calculation unit.

2. The vibration suppressing device according to claim 1, wherein the second calculation unit calculates current phase information based on arithmetic expressions (1) to (3), previous phase information based on the previous machining information, and the optimal rotation speed based on the calculated current phase information and the calculated previous phase information:

$$k' \text{ number} = 60 \times \text{frequency of chatter vibration}/(\text{the number of tool flutes} \times \text{rotation speed of rotary shaft}) \quad (1)$$

$$k \text{ number} = \text{integer part of } k' \text{ number} \quad (2)$$

$$\text{phase information} = k' \text{ number} - k \text{ number} \quad (3).$$

3. A vibration suppressing method for a machine tool having a rotary shaft for suppressing a chatter vibration generated when the rotary shaft is rotated, the method comprising the steps of:
    detecting a time-domain vibration due to the rotating rotary shaft;
    calculating a chatter frequency and a frequency-domain vibrational acceleration in the chatter frequency based on the time-domain vibration detected in the detection step, and when the calculated frequency-domain vibrational acceleration exceeds a predetermined threshold value, calculating current machining information using at least the calculated chatter frequency; storing the calculated current machining information; and when previous machining information is not stored, calculating a stable rotation speed capable of suppressing the chatter vibration of the rotary shaft using the calculated current machining information, and when previous machining information is stored, calculating the stable rotation speed using at least the calculated current machining information; and
    controlling a rotation speed of the rotary shaft at the stable rotation speed calculated in the calculating step.

4. The vibration suppressing method according to claim 3, further comprising: calculating the stable rotation speed based on arithmetic expressions (1) to (3) wherein a k number calculated by the arithmetic expression (2) is stored, and when the calculated k number does not correspond with the k number previously stored, replacing the previously stored k number with the calculated k number for calculating the stable rotation speed;

$$k' \text{ number} = 60 \times \text{frequency of chatter vibration}/(\text{the number of tool flutes} \times \text{rotation speed of rotary shaft}) \quad (1)$$

$$k \text{ number} = \text{integer part of } k' \text{ number} \quad (2)$$

$$\text{optimal rotational speed} = 60 \times \text{frequency of chatter vibration}/(\text{the number of tool flutes} \times (k1 \text{ number} + 1)) \quad (3).$$

5. A vibration suppressing device for a machine tool having a rotary shaft for suppressing chatter vibration generated when the rotary shaft is rotated, the device comprising:
    a detection unit to detect a time-domain vibration due to the rotation of the rotary shaft;
    a calculation unit to calculate a chatter frequency and a frequency-domain vibrational acceleration in the chatter frequency based on the time-domain vibration detected by the detection unit, and when the calculated frequency-domain vibrational acceleration exceeds a predetermined threshold value, the calculation unit calculates current machining information using at least the chatter frequency and stores the calculated current machining information, and when previous machining information is not stored, the calculation unit calculates a stable rotation speed capable of suppressing the chatter vibration of the rotary shaft using the calculated current machining information, and when previous machining information is stored, the calculation unit calculates the stable rotation speed using at least the calculated machining information; and
    a rotation speed control unit to rotate the rotary shaft at the stable rotation speed calculated by the calculation unit.

6. The vibration suppressing device according to claim 5, wherein the calculation unit calculates the stable rotation speed based on arithmetic expressions (1) to (3) wherein a k number calculated using arithmetic expression (2) is stored, and when the calculated k number does not correspond with the k number previously stored, the previously stored k number is replaced with the calculated k number to calculate the stable rotation speed;

$$k' \text{ number} = 60 \times \text{frequency of chatter vibration}/(\text{the number of tool flutes} \times \text{rotation speed of rotary shaft}) \quad (1),$$

$$k \text{ number} = \text{integer part of } k' \text{ number} \quad (2)$$

$$\text{optimal rotational speed} = 60 \times \text{frequency of chatter vibration}/(\text{the number of tool flutes} \times (k1 \text{ number} + 1)) \quad (3).$$

* * * * *